(12) United States Patent
Bernloehr et al.

(10) Patent No.: US 9,676,462 B2
(45) Date of Patent: Jun. 13, 2017

(54) TROLLING MOTOR WITH POWER STEERING

(71) Applicants: Darrel A. Bernloehr, Mankato, MN (US); David M. Samek, Eagle Lake, MN (US); Justin Alders, Madison Lake, MN (US)

(72) Inventors: Darrel A. Bernloehr, Mankato, MN (US); David M. Samek, Eagle Lake, MN (US); Justin Alders, Madison Lake, MN (US)

(73) Assignee: Johnson Outdoors Inc., Racine, WI (US)

( * ) Notice: Subject to any disclaimer, the term of this patent is extended or adjusted under 35 U.S.C. 154(b) by 0 days.

(21) Appl. No.: 14/746,448

(22) Filed: Jun. 22, 2015

(65) Prior Publication Data

US 2016/0001865 A1 Jan. 7, 2016

Related U.S. Application Data

(60) Provisional application No. 62/020,159, filed on Jul. 2, 2014.

(51) Int. Cl.
| | | |
|---|---|---|
| *B60L 15/20* | (2006.01) | |
| *B63H 20/12* | (2006.01) | |
| *B63H 20/00* | (2006.01) | |
| *B63H 25/02* | (2006.01) | |
| *B63H 21/17* | (2006.01) | |
| *B63H 21/21* | (2006.01) | |

(52) U.S. Cl.
CPC ........... *B63H 20/12* (2013.01); *B63H 20/007* (2013.01); *B63H 21/17* (2013.01); *B63H 21/21* (2013.01); *B63H 25/02* (2013.01); *B63H 2025/026* (2013.01)

(58) Field of Classification Search
CPC ...... B63H 20/007; B63H 20/08; B63H 20/12; B63H 23/04; B63H 23/24; B63H 2020/02; B63H 2020/08
USPC .......................................... 440/6, 7, 49, 61 S
See application file for complete search history.

(56) References Cited

U.S. PATENT DOCUMENTS

| | | | | |
|---|---|---|---|---|
| 4,114,074 A | * | 9/1978 | Stewart | B63H 25/24 318/257 |
| 4,746,311 A | * | 5/1988 | Kraus | B63H 20/007 114/144 E |
| 4,824,408 A | * | 4/1989 | Aertker | B63H 20/007 114/144 A |
| 4,838,818 A | * | 6/1989 | Edwards | B63H 20/007 114/144 R |
| 5,112,256 A | * | 5/1992 | Clement | B63H 20/007 440/58 |
| 5,171,173 A | * | 12/1992 | Henderson | B63H 20/007 114/153 |
| 5,386,368 A | | 1/1995 | Knight | |

(Continued)

*Primary Examiner* — Daniel V Venne
(74) *Attorney, Agent, or Firm* — Reinhart Boerner Van Deuren P.C.

(57) ABSTRACT

A trolling motor system with power steering and associated methods are provided. The trolling motor system includes a power steering module mounted to a mount of the trolling motor system. The power steering module is operable to rotate a trolling motor assembly of the trolling motor system about an axis thereof based upon at least one of a mechanical or an electrical input.

20 Claims, 7 Drawing Sheets

(56) References Cited

U.S. PATENT DOCUMENTS

| | | | |
|---|---|---|---|
| 5,465,633 A * | 11/1995 | Bernloehr | B63H 20/007 114/153 |
| 5,884,213 A | 3/1999 | Carlson | |
| 6,325,684 B1 * | 12/2001 | Knight | B63H 20/007 114/144 RE |
| 7,163,427 B1 * | 1/2007 | Lee | B63H 20/007 440/6 |
| 7,538,511 B2 * | 5/2009 | Samek | B63H 20/007 318/548 |
| 7,722,417 B2 | 5/2010 | Bernloehr et al. | |
| 8,463,458 B2 | 6/2013 | Wood et al. | |
| 8,463,470 B2 | 6/2013 | Wood et al. | |
| 8,543,269 B1 | 9/2013 | Wood et al. | |
| 8,577,525 B2 | 11/2013 | Wood et al. | |
| 8,606,432 B1 | 12/2013 | Wood et al. | |
| 2007/0197107 A1 * | 8/2007 | Lee | B63H 5/125 440/6 |
| 2007/0238371 A1 * | 10/2007 | Nyren | B63H 20/12 440/62 |
| 2008/0169779 A1 * | 7/2008 | Samek | B63H 20/007 318/588 |
| 2012/0015566 A1 | 1/2012 | Salmon | |
| 2012/0232719 A1 | 9/2012 | Salmon et al. | |

\* cited by examiner

TROLLING MOTOR WITH POWER STEERING

CROSS-REFERENCE TO RELATED PATENT APPLICATIONS

This patent application claims the benefit of U.S. Provisional Patent Application No. 62/020,159, filed Jul. 2, 2014, the entire teachings and disclosure of which are incorporated herein by reference thereto.

FIELD OF THE INVENTION

This invention generally relates to watercraft equipment, and more particularly to trolling motors.

BACKGROUND OF THE INVENTION

Fishing boats and other vessels are often equipped with a trolling motor for providing a relatively small amount of thrust to slowly and quietly propel the boat or vessel. They advantageously provide for a finer adjustment of watercraft position than a main motor/propeller combination. One example of a contemporary trolling motor system may be found at U.S. Pat. No. 7,722,417 to Bernloehr et al., the entire teachings and disclosure of which are incorporated by reference herein.

Trolling motors remain a viable and sought after apparatus for various applications, including but not limited to fishing, recreation, and commercial applications. Over time, two distinct steering configurations have become quite desirable, for different reasons.

The first is the cable steer configuration. Such configurations typically include a pedal with one or more control cables extending therefrom. As a user manipulates the position of the pedal, they also manipulate the control cables. The control cables are connected to a trolling motor assembly in a tensioned state, such that their movement causes a rotation of the trolling motor assembly to manipulate the direction of thrust provided by the trolling motor assembly. This allows the user to steer a watercraft incorporating the trolling motor assembly. An example of such a cable steer configuration may be seen at U.S. Pat. No. 5,465,633 to Bernloehr, the entire teachings and disclosure of which are incorporated by reference herein.

From the above, it will be recognized that such cable steer configurations are purely mechanical in their steering configuration such that the pedal is mechanically linked to the trolling motor assembly. As a result, movement of the pedal causes movement of the trolling motor assembly, and vice versa. As such, there is a tactile feedback provided in the pedal based upon the movement of the trolling motor assembly, as well as its angular orientation about a longitudinal axis extending along a length of trolling motor system. This tactile feedback has made such cable steer configurations desirable to many users, as it allows them to "feel" the position of the trolling motor assembly based upon the feedback at the pedal.

Second, there is the electronic steer configuration. Such "fly-by-wire" systems may utilize a pedal or other control, but instead of a mechanical linkage an electrical signal is provided to the trolling motor assembly based upon a user input to govern the steering of the trolling motor assembly. Such systems incorporate a steering motor which, upon receipt of the electrical signal, moves the trolling motor assembly to a desired position. While such systems do not provide the tactile feedback of mechanical cable configurations described above, they offer the advantage of various electronic steering control functions such as auto-pilot, and other navigational functions, for example those functions described in U.S. Pat. Nos. 5,386,368, 5,884,213, 8,463,470, 8,463,458, 8,577,525, 8,606,432, 8,543,269, as well as U.S. patent application Ser. Nos. 13/479,381, and 13/174,944. The teachings and disclosures of each of the aforementioned issued patents and pending applications are incorporated by reference herein in their entireties.

Additionally, such electronic steer systems do not require an abundance of actuation force to steer the same, regardless of other conditions. Indeed, in a cable steer system, the flow of water past the motor and propeller of the trolling motor assembly as the watercraft is moving may cause the trolling motor assembly to rotate from its current position, a phenomena referred to as "torque steer." A user must counter-act this by placing a greater actuation force on the pedal. In electronic systems, the motor providing the steering force is scaled to handle a broad range of operational reaction forces. There is no need to press a pedal harder or the like if there is a greater current acting upon the trolling motor system in such systems.

The above described automated navigational functionality and input force independence of trolling motors utilizing electronic steer configurations has also made such systems quite desirable. While both the cable steer and electronic steer configurations provide distinct advantages, users have heretofore had to choose between the set of advantages provided by each system. Accordingly, there is a need in the art for a trolling motor system that provides both the tactile feedback of a conventional cable steer system, but also allows for automated electronic steering functionality The invention provides such a trolling motor system. These and other advantages of the invention, as well as additional inventive features, will be apparent from the description of the invention provided herein.

BRIEF SUMMARY OF THE INVENTION

In one aspect, a trolling motor system is provided. An embodiment of such a trolling motor system includes a mount for mounting the trolling motor system to a watercraft. The system also includes a power steering module connected to the mount. The system also includes a trolling motor assembly received by the power steering module. A pedal assembly is provided which is mechanically and electrically coupled to the power steering module to provide mechanical and electrical steering commands to the power steering module.

In this embodiment, the pedal assembly is mechanically coupled to the power steering module by at least one cable operably connected between the pedal assembly and the power steering module. The at least one cable can include a first cable and a second cable. In such a configuration, each of the first and second cables are connected at one end to a pedal of the pedal assembly, and each of the first and second cables are connected at their other end to a cable drum of the power steering module.

In such an embodiment, a rotation of a pedal of the pedal assembly about an axis of rotation in a first rotational direction causes the first cable to be taken up by the cable drum and the second cable to be paid out from the cable drum. A rotation of the pedal assembly about the axis of rotation in a second rotational direction opposite the first rotational direction causes the first cable to be paid out from the cable drum and the second cable to be taken up by the cable drum.

According to this embodiment, the cable drum is mechanically coupled to the trolling motor assembly such that rotation of the cable drum causes a corresponding rotation of the trolling motor assembly about a longitudinal axis thereof.

In this embodiment, the pedal assembly is electrically coupled to the power steering module by an electrical connection which is one of wired or wireless. The pedal assembly includes a pedal rotationally mounted to a pedal base. The pedal assembly also includes at least one sensor. The sensor is arranged and configured to detect a control input at the pedal. Such a control input is electrically communicated via the electrical connection to the power steering module.

In this embodiment, the power steering module further comprises a motor connected to the electrical connection. The motor is configured such that the motor imparts a torque to the trolling motor assembly to cause the trolling motor assembly to rotate about a longitudinal axis thereof in response to the rotation of the pedal detected by the at least one sensor.

In another aspect, a trolling motor system is provided. An embodiment of a system according to this aspect includes a mount for mounting the trolling motor system to a watercraft. The mount includes a base assembly and a main arm assembly moveable relative to the base assembly. The system also includes a power steering module connected to an end of the main arm assembly and moveable relative to the base with the main arm assembly. The system also includes a trolling motor assembly received by the power steering module. The trolling motor assembly is linearly slideable relative to the power steering module about a first axis. The trolling motor assembly is also rotatable in first and second rotational directions about the first axis relative to the power steering module by way of an input torque provided by the power-steering module. A pedal assembly is also provided for supplying an input signal to the power steering module.

In this embodiment, the pedal assembly is mechanically and electrically coupled to the power steering module to provide the input signal to the power steering module. The power steering module is configured such that the input signal is converted to an input torque applied to the trolling motor assembly.

In this embodiment, the power steering module includes a cable drum, a motor, and a drive train. The cable drum and motor are mechanically coupled to the drive train. The drive train imparts the input torque to the trolling motor assembly. At least one cable is connected between the cable drum and the pedal assembly such that a rotation of a pedal of the pedal assembly relative to a base of the pedal assembly causes a rotation of the cable drum. The cable drum is mechanically coupled to the drive train such that rotation of the cable drum causes a rotation of a steer tube of the drive train.

An electrical connection is also formed between the motor and the pedal assembly such that rotation of the pedal relative to the base causes a rotation of a drive shaft of the motor. The drive shaft is mechanically coupled to the drive train such that rotation of the drive shaft causes a rotation of the steer tube of the drive train. The steer tube slidably receives the trolling motor assembly.

In yet another aspect, a power steering system for a trolling motor system is provided. An embodiment of a power steering system according to this aspect includes a power steering module configured for connection to a portion of the trolling motor system. A pedal assembly is also provided which is connected to the power steering module to provide control inputs to the power steering module.

In this embodiment, the power steering module is configured to receive a trolling motor assembly of the trolling motor system. The power steering module is configured to change an angular orientation of the trolling motor assembly in response to the control inputs. The mechanical control input is communicated by a mechanical connection formed between the pedal assembly and the power steering module, and wherein the electrical control input is communicated by an electrical connection formed between the pedal assembly and the power steering module.

In yet another aspect, a power steering system for a trolling motor system having at least one cable for providing steering inputs thereto is provided. The power steering system includes a pedal assembly. The pedal assembly is configured to mechanically connect to the at least one cable of the trolling motor system. The pedal assembly includes a pedal rotatable about a pedal axis relative to a base of the pedal assembly to actuate the at least one cable. The pedal assembly also includes a motor. The motor is mounted within the pedal assembly and operably connected to the pedal assembly to apply an input torque about the pedal axis upon a rotation of the pedal.

In yet another aspect, a method for operating a trolling motor is provided. An embodiment of a method according to this aspect includes steering a trolling motor assembly of the trolling motor system with a power steering module. The step of steering includes rotating the trolling motor assembly about an axis of the trolling motor assembly based upon an input torque provided by at least one of a mechanical input and an electrical input.

In yet another aspect, a trolling motor system is provided. An embodiment of a trolling motor system according to this aspect includes a mount for mounting a trolling motor system to a watercraft. The system also includes a power steering module connected to the mount. The system also includes a trolling motor assembly. The power steering module is configured to rotate the trolling motor assembly about an access of the trolling motor assembly based upon an input torque provided by at least one of a mechanical input and an electrical input.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
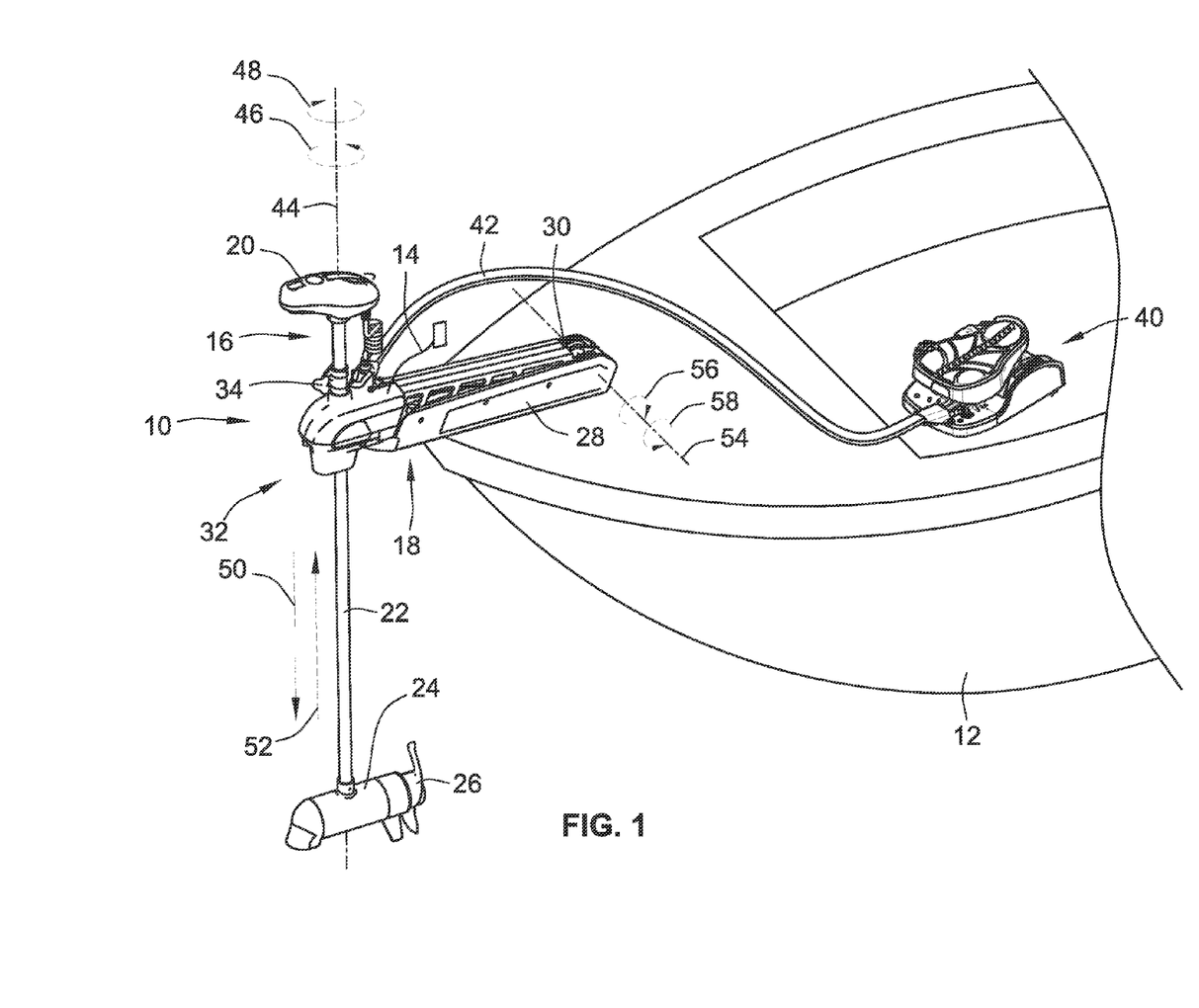
FIG. 1 is a perspective view of one embodiment of a trolling motor system according to the teachings of the present invention mounted to a watercraft in a deployed position.

Turning now to the drawings, an embodiment of a trolling motor system 10 is illustrated therein which advantageously provides a new steering configuration over contemporary trolling motor systems by incorporating the advantages of a mechanical steer configuration as well as an electronic steer configuration. With particular reference to FIG. 1, trolling motor system 10 is illustrated mounted to a watercraft 12. A rope 14 is associated with trolling motor system 10 for transitioning trolling motor system 10 from the deployed state shown in FIG. 1 to the stowed state shown in FIG. 2. As is recognized in the art, such functionality allows a user to place trolling motor system 10 into a stowed position for transportation of the watercraft 12, as well as for placing the trolling motor system 10 in a position when not in use.

Trolling motor system 10 includes a trolling motor assembly 16, and a mount 18 for mounting trolling motor system 10 to watercraft 12. Trolling motor assembly 16 includes a head unit 20, a shaft 22 extending from head unit 20, and a propulsion unit 24 positioned at an end of shaft 22. A propeller 26 is mounted to propulsion unit 24, and upon rotation thereof, provides thrust for steering and guiding watercraft 12.

Mount 18 includes a base assembly 28, and a main arm assembly 30 rotatable relative to base assembly 28 to allow for the aforementioned transitioning between the stowed and deployed positions of trolling motor system 10. Such functionality and structural detail is described at length at U.S. Pat. No. 7,722,417 incorporated by reference above. Indeed, mount 18 is identical in structure and function to that described at U.S. Pat. No. 7,722,417, and for purposes of brevity, a repeated discussion of this mount is dispensed with. It should be noted, however, that mount 18 is only one example of a trolling motor mount to which a below discussed power steering module 32 may be mounted. In other embodiments, power steering module 32 may be mounted to any other trolling motor mount and achieve the advantages herein.

Power steering module 32 is mounted at an end of main arm assembly 30. Shaft 22 is slideable relative to power steering module 32, and is also rotatable relative to steering module 32 to provide the steering functionality described herein.

Trolling motor system 10 also incorporates a pedal assembly 40 which is utilized to provide steering and other inputs to trolling motor system 10. A cable assembly 42 extends from pedal assembly 40 and is operatively connected to power steering module 32 to communicate mechanical and electronic control commands provided at pedal assembly 40 to trolling motor assembly 16. As will be described in greater detail below, a mechanical and electronic linkage is provided between pedal assembly 40 and power steering module 32 so as to provide for the advantages of a cable steer and electronic steer configuration in a single system.

More specifically, pedal assembly 40 is utilized to communicate both a mechanical and electronic signal to trolling motor assembly 16 to rotate the same about a first axis 44 in first and second rotational directions 46, 48. Additionally, the trim position, i.e. the vertical distance between propulsion unit 24 and power steering module 32 may be adjusted along first axis 44 in first and second linear directions 50, 52. This linear adjustment is achieved manually by loosening a depth collar 34, sliding the trolling motor assembly 16 in first or second linear directions 50, 52 along first axis 44 to a desired position, and then retightening depth collar 34 to lock trolling motor assembly 16 in a desired trimmed position. In other embodiments, however, such trim adjustment may be achieved in an automated fashion by way of a trim adjustment module having a motor operatively coupled to trolling motor assembly 16 to move the same along first axis 44 in first and second linear direction 50, 52.

Figure 2:
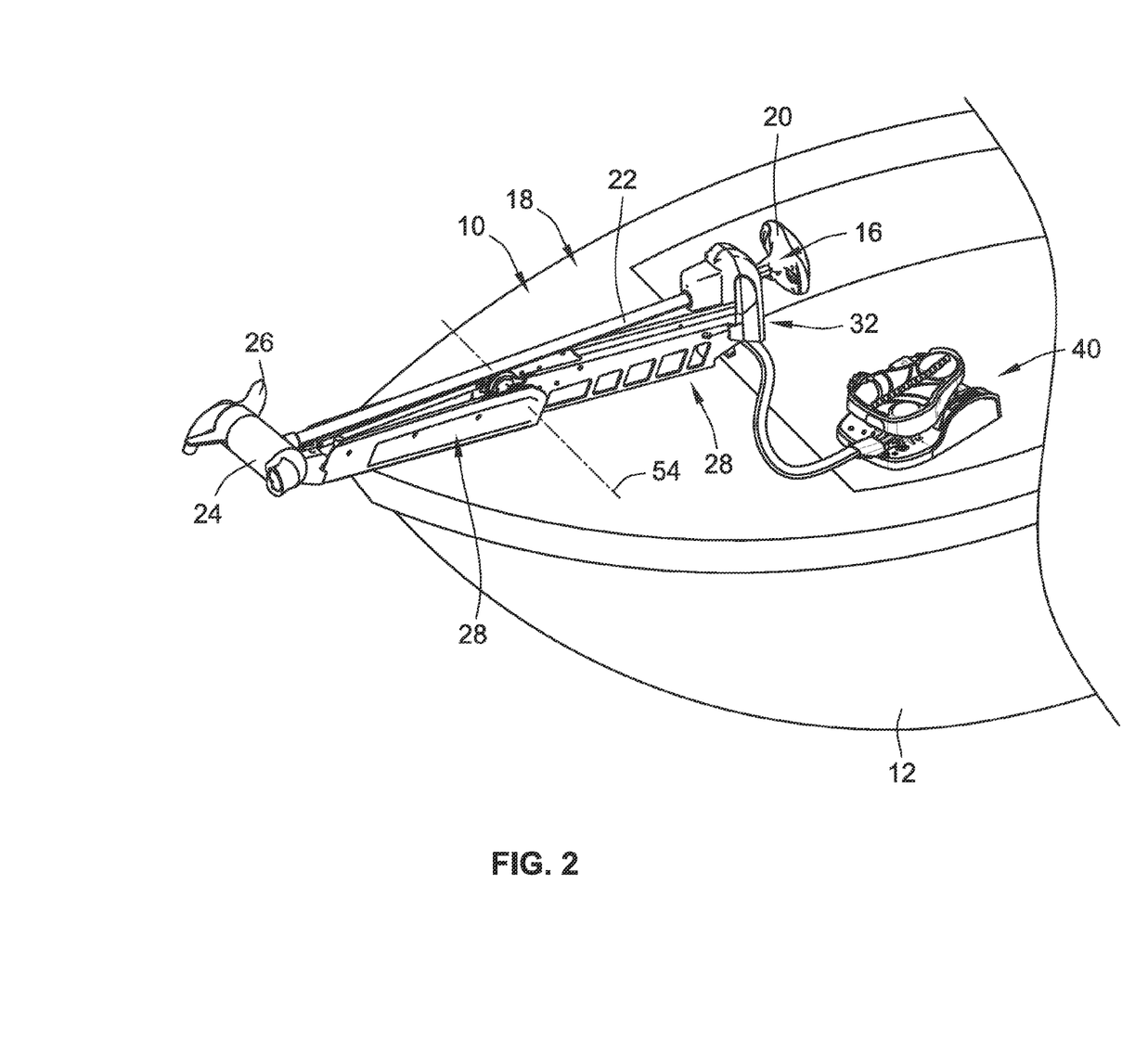
FIG. 2 is a perspective view of the trolling motor system of FIG. 1 in a stowed position.

Trolling motor assembly 16, main arm assembly 30, and power steering module 32 are rotatable in unison with one another relative to base assembly 28 about second axis 54 in first and second rotational directions 56, 58. Rotating the aforementioned components about second axis 54 in first rotational direction 56 will ultimately place trolling motor system 10 into its stowed position as schematically represented at FIG. 2 (the particular structure shown being exemplary only). To transition trolling motor system 10 back to the deployed position as shown in FIG. 1 from the stowed position in FIG. 2, a user simply rotates the aforementioned components about second axis 54 in second rotational direction 58.

Figure 3:
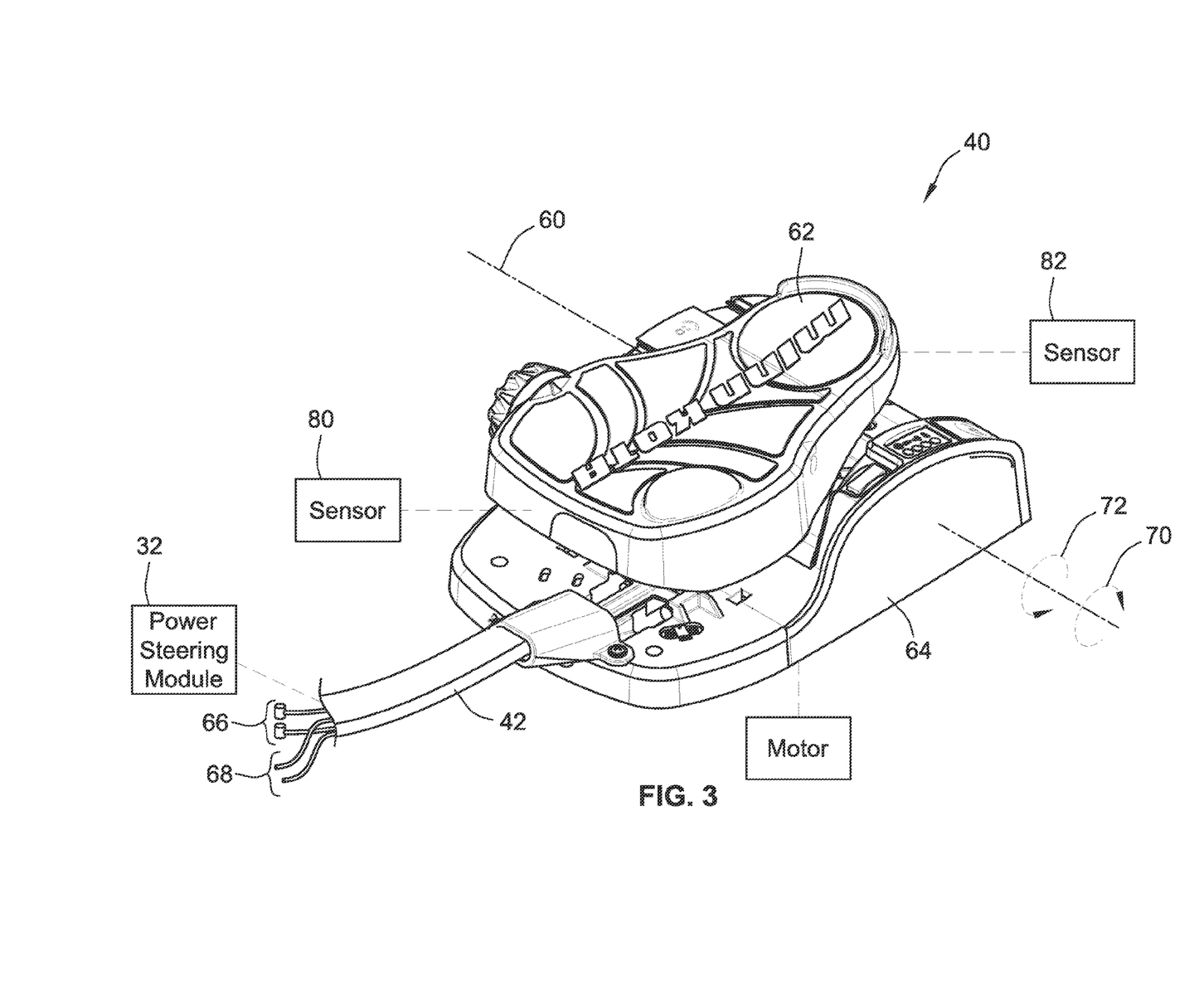
FIG. 3 is a perspective view of a pedal assembly and cable assembly of the trolling motor system of FIG. 1.

As introduced above, pedal assembly 40 is connected to power steering module 32 and provides both mechanical and electronic control signals to trolling motor assembly 16. Turning now to FIG. 3, pedal assembly 40 is shown in greater detail. Pedal assembly 40 includes a pedal 62 which is rotatable about a third axis 60 (also referred to herein as a pedal axis) relative to a base 64 of pedal assembly 40. More specifically, pedal 62 is rotatable relative to base 64 in first and second rotational directions 70, 72. As will be explained in greater detail below, rotation of pedal 62 about third axis 60 in first rotational direction 70 will cause trolling motor assembly 16 to rotate about first axis 44 (see FIG. 1) in one of first and second rotational directions 46, 48. Rotation of pedal 62 about third axis 60 in second rotational direction 72 will cause trolling motor assembly 16 to rotate about first axis 44 in the other one of rotational directions 46, 48. As such, the aforementioned rotations of pedal 62 relative to base 64 effectuate the steering of trolling motor assembly 16.

The aforementioned rotations of pedal 62 about third axis 60 are converted to both mechanical and electrical signals. As for the mechanical signal, one or more cables 66 are mechanically coupled to pedal assembly 40 and are routed through cable assembly 42 and are ultimately connected to power steering module 32. In the particular embodiment, two cables 66 are utilized, and as will be discussed below, are connected to a cable drum 102 (see FIG. 4) of power steering module 32. Rotation of pedal 62 about third axis 60 in first rotational direction 70 will cause one of the two cables 66 to be drawn up by the aforementioned cable drum 102 and the other one of cable 66 to be paid out from the aforementioned cable drum 102. The reverse is true upon rotation of pedal 62 about third axis 60 in second rotational direction 72. The connection of cables 66 to pedal assembly 40 and their attendant functionality are described in greater detail at U.S. Pat. No. 5,465,633, the teachings of which were incorporated by reference to above. While dual cables are illustrated, it will be recognized by those of skill in the art that a single cable could also be employed to effectuate the mechanical coupling and steering control described herein.

As for the electrical signal, a plurality of lead wires 68 are connected to pedal assembly 40 and extend through cable assembly 42 to ultimately connect to power steering module 32. A first and a second sensor 80, 82 are positioned within pedal 62 to detect a control input at the pedal by a user, e.g. a rotation thereof about first and second rotational directions 70, 72. The sensors 80, 82 may be connected directly to pedal 62, or alternatively mounted to pedal base. Further, more or fewer than two sensors 80, 82 may be utilized depending upon the type of sensor chosen. These rotations are converted to an electrical signal and are transmitted to power steering module 32. The sensors 80, 82 may be positioned such that they no longer send a signal once pedal 62 is at its maximum point of travel in either of first or second rotational directions 70, 72 to synchronize maximum angular steering adjustment with the maximum travel of the pedal. Alternatively, additional sensors may be utilized to signal when pedal 62 is at its maximum point of travel. As will be described below, this signal is utilized to provide a steering control signal to a motor of power steering module 32 which is operatively connected to trolling motor assembly 16 to rotate the same about first axis 44 in first and second rotational directions 46, 48.

Figure 4:
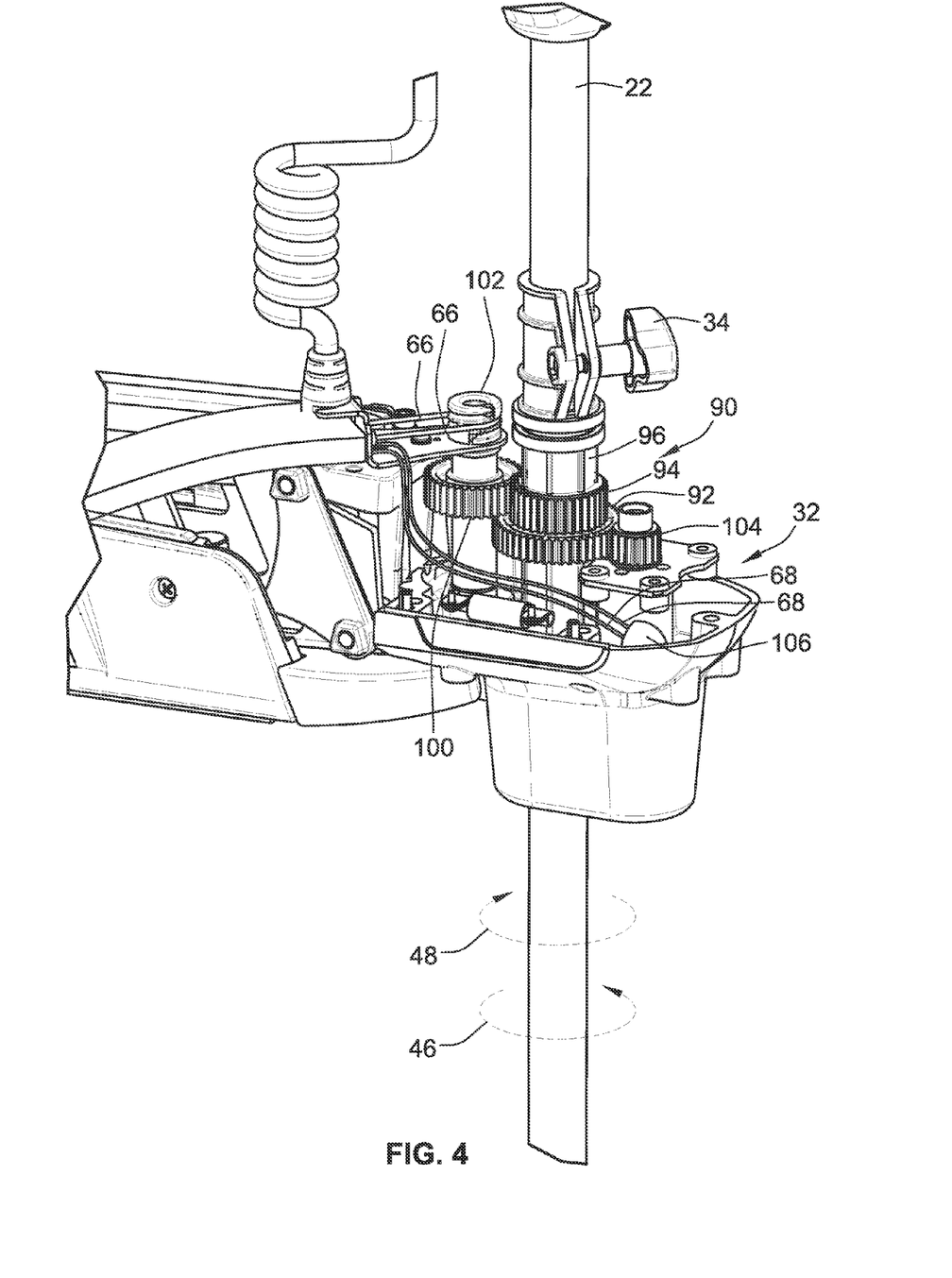
FIG. 4 is a partial perspective view of a power steering module of the trolling motor assembly of FIG. 1.

Turning now to FIG. 4, the aforementioned connections from pedal assembly 40 to power steering module 32 introduced at FIG. 3 are shown in greater detail. FIG. 4 illustrates a perspective view of power steering module 32, with housing coverings thereof removed to expose the inner componentry of power steering module 32. As can be seen in FIG. 4, power steering module 32 includes a drive train 90. Drive train 90 includes a first drive gear 92 and a second drive gear 94, each of which are connected to a steer tube 96. Shaft 22 of trolling motor assembly 16 is slideable along first axis 44 in first and second linear directions 50, 52 within steer tube 96. However, shaft 22 includes a keyway 98 into which a keyed feature 108 (see FIG. 5) projecting from an interior surface of steer tube 96 extends. As a result, rotation of steer tube 96 results in rotation of shaft 22. Each of first and second drive gears 92, 94 are rigidly connected to steer tube 96 such that in input torque introduced to either of first and second drive gears 92, 94 will achieve the aforementioned rotation of shaft 22.

Drive train 90 also includes a cable drum gear 100 which is rotatable with the aforementioned cable drum 102 described above relative to FIG. 3. As such, rotation of cable drum 102 about its center axis due to the aforementioned drawing in and paying out of cables 66 will rotate cable drum gear 100. Rotation of cable drum gear 100 will also result in rotation of second drive gear 94 to ultimately rotate shaft 22 about first axis 44 in first and second rotational directions 46, 48. As an alternative embodiment to the use of a cable drum gear 100 which meshes with second drive gear 94, a rack and pinion style configuration is also possible. In such a configuration, the pinion is effectively the second drive gear 94. The rack is situated directly on a linear section extending from cable drum 102 and meshes with second drive gear. As the linear section of cable moves, the rack will move across the pinion, thus causing the same input to second drive gear 94.

Drive assembly 90 also includes a motor drive gear 104 which is connected to a rotatable output shaft of a motor 106 of power steering module 32. The aforementioned electrical signals provided by way of lead wires 68 are delivered to motor 106 to rotate motor drive gear 104. This rotation of motor drive gear 104 in turn rotates first drive gear 92 to ultimately rotate shaft 22 about first and second rotational directions 46, 48 as described above.

More specifically, as a user rotates pedal 62 about third axis 60 in either of rotational directions 70, 72, such rotation is detected by first and second sensors 80, 82. This detection is then converted to an electrical signal delivered by lead wires 68 to motor 106. As a result, a corresponding rotation of shaft 22 in one of rotational directions 46, 48 is achieved. Due to the connection of second drive gear 94 to cable drum gear 100 as shown in FIG. 4, the aforementioned rotation caused by motor 106 is communicated to cable drum 102. As such, the mechanical drawing in and paying out of cables 66 is assisted by way of the torque provided by motor 106 through drive train 90. Advantageously, this causes pedal 62 to move as a result of the drawing in and paying out of cables 66. Accordingly, the above described tactile feedback previously reserved only for purely mechanical systems is maintained by trolling motor system 10 despite the fact of the use of an electronic steering configuration provided by power steering module 32.

It will be recognized that in the event of a power failure, shaft 22 is still rotatable about first and second rotational directions 46, 48 purely under the torque provided by the drawing in and paying out of cables 66 about cable drum 102 as a result of movement of pedal 62 as described above. In other words, another advantage of the embodiment shown is that despite the fact of a power outage, steering of trolling motor system 10 is still possible by way of a purely mechanical steering configuration.

Figure 5:
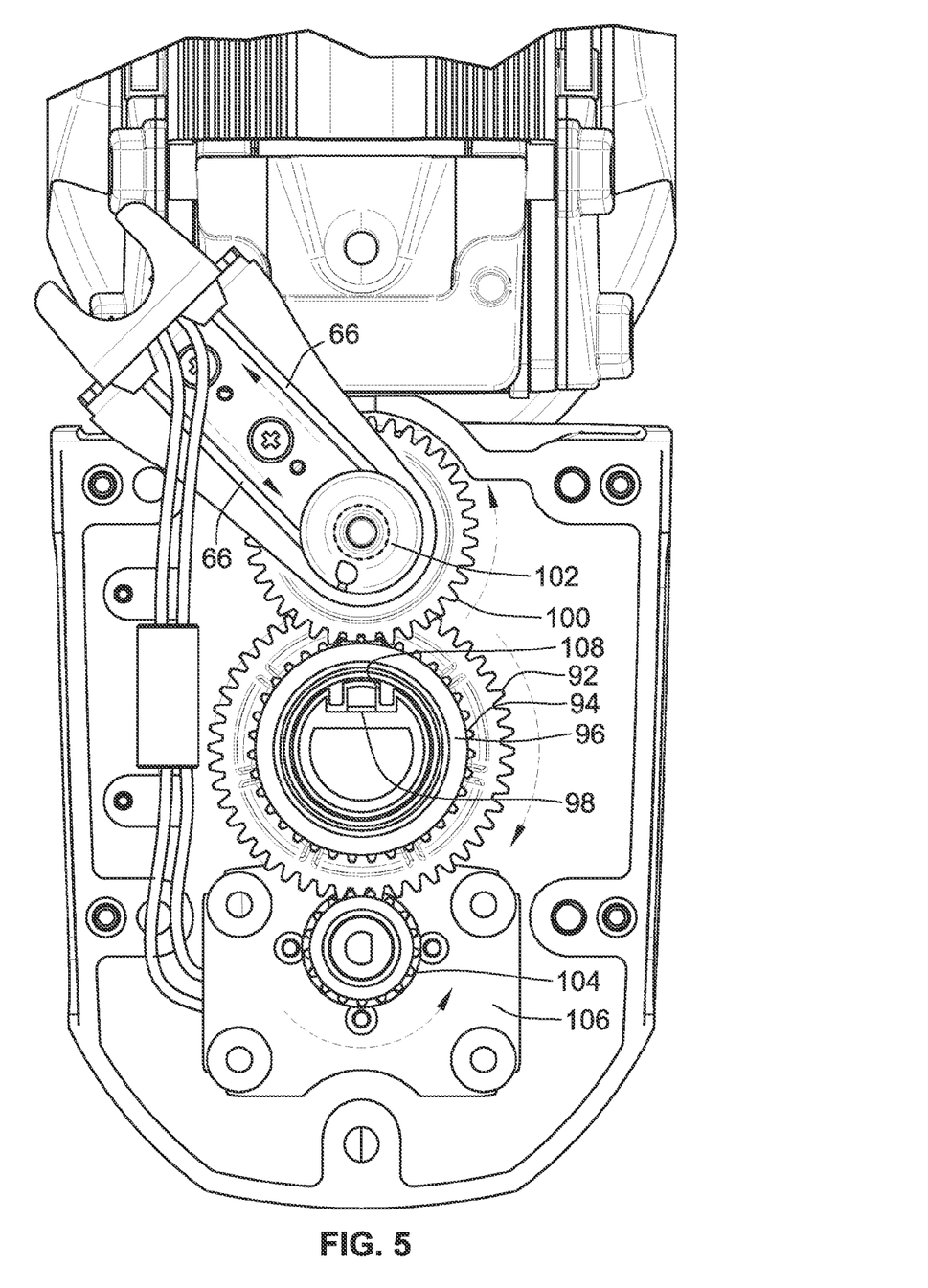
FIG. 5 is a top cross sectional view of a drive train of the power steering module of FIG. 4.

The above described arrangement of drive train 90 is shown in a top cross sectional view at FIG. 5. It will be noted that in this view the above described keyway 98 and corresponding keyed feature 108 of steer tube 96 are shown in this view. Also shown in this view are several exemplary rotational arrows associated with drive train 90 illustrating the conversion of the rotational motion of the various gearing of drive train 90 into the linear motion of cables 66.

It will be noted by those of skill in the art that the cable connection of the instant invention is made at the power steering module 32, which is mounted to an end of moveable main arm assembly 30 of mount 18. This is a significant departure from prior cable steer configurations, which typically provide their cable connection at the head unit of their respective trolling motor assembly. In such configurations, the cable assembly extending from the head unit rotates with the head unit and can become entangled with other items. In the instant system, the cable connection is made at the power steering module 32 which remains rotationally stationary as trolling motor assembly 16 (See FIG. 1) rotates in first and second rotational directions 46, 48 about first axis 44. It is contemplated by the invention, however, that head unit 20 may incorporate the componentry of power steering module 32 described herein such that pedal assembly 42 is connected by way of cable assembly to head unit 20.

With momentary reference back to the schematic representation shown at FIG. 2, it will be noted, however, that power steering module 32 is rotatable about its connection point to main arm assembly 30 as illustrated to allow for the placement of trolling motor system 10 into the stowed position. Such movement of power steering module 32 results in slight movement of cable assembly 42. However, this movement is considerably minimal compared to prior designs.

Figure 6:
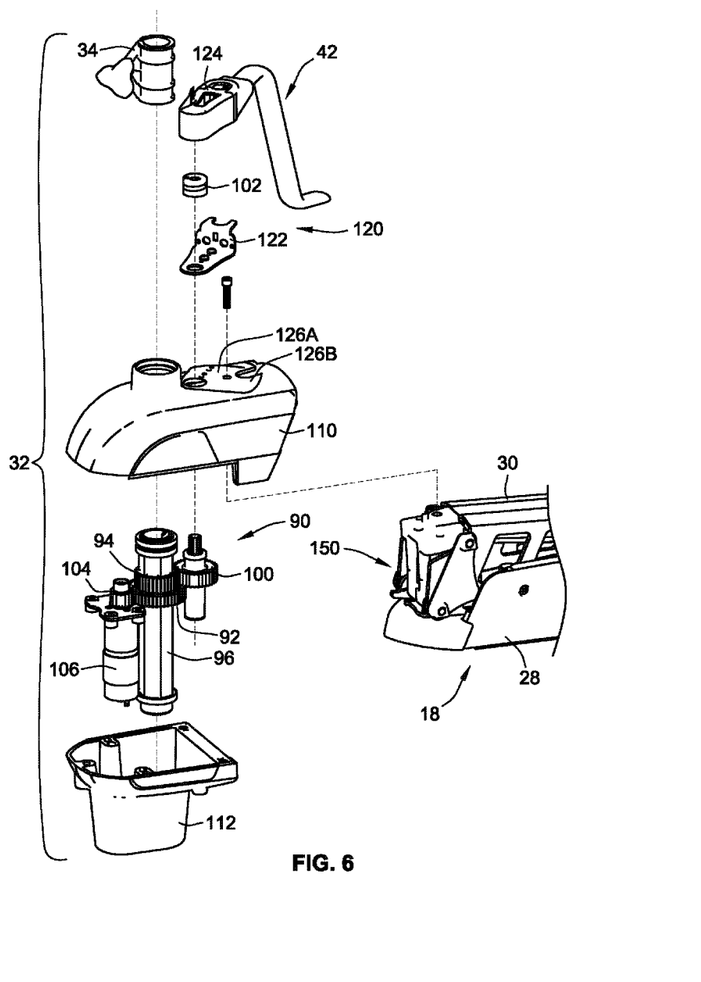
FIG. 6 is a perspective exploded view of the power steering module of FIG. 4.

Turning now to FIG. 6, power steering module 32 is shown in an exploded view. Power steering module includes a two-part housing having an upper housing body 110 and a lower housing body 112. Drive train 90 is contained within the two-part housing. Steering module 32 pivotally mounts to an end of main arm assembly 30 at a linkage assembly 150 which is the same as the linkage assembly described in U.S. Pat. No. 7,722,417 which was previously incorporated by reference in its entirety.

Cable assembly 42 includes a cable drum cover assembly 120 at an end thereof. Cable drum cover assembly 120 mounts to an exterior of upper housing body 110 generally at region 126A. However, the orientation of cable drum cover assembly 120 may be modified such that it mounts at region 126B. This variable mounting allows a user to decide from which side of power steering module 32 cable assembly 42 projects from.

Cable drum cover assembly 120 includes a bottom plate 122 and a top cover 124. Cable drum 102 is mounted between bottom plate 122 and top cover 124. A portion of cable drum gear 100 extends through apertures formed in upper housing body 110 and bottom plate 122. Cable drum 102 is fixedly mounted to this portion of cable drum gear 100 such that it is rotatable therewith.

Having described the various structural aspects of the illustrated embodiment, a description of the operational aspects of the illustrated embodiment is provided in the following.

Figure 7:
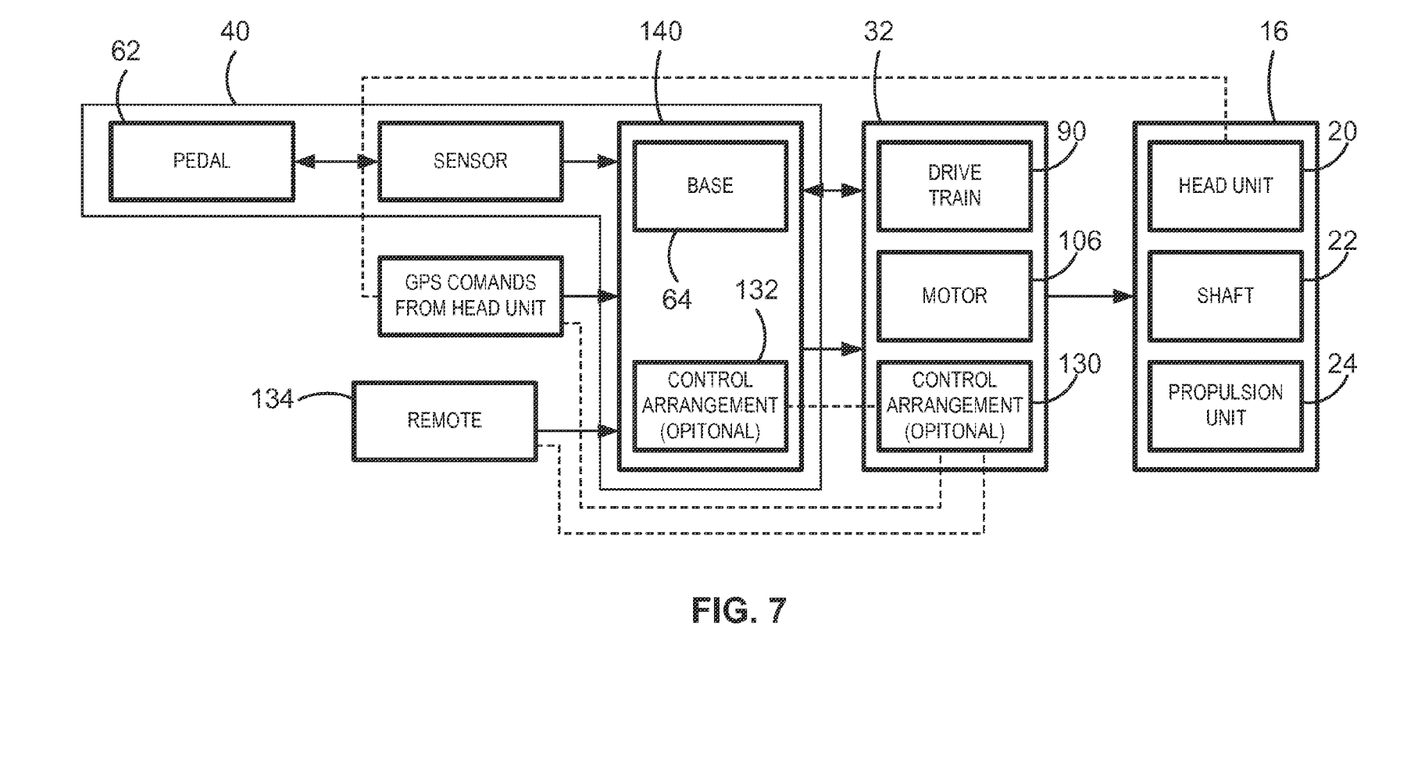
FIG. 7 is a schematic view of the operational scheme of the trolling motor system of FIG. 1.

With particular reference to FIG. 7, a schematic representation of the connection between pedal assembly 40 and trolling motor assembly 16 is illustrated. In the illustrated configuration, a mechanical connection (by cables 66) and electrical connection (by lead wires 68) are formed between pedal assembly 40 and power steering module 32 to provide control inputs to power steering module 32. As discussed above, the mechanical connection is principally made by way of cable 66, while the electrical connection is principally made by lead wires 68.

The electrical connection between pedal assembly 40 and power steering module 32 is more specifically formed between pedal assembly 40 and motor 106. Indeed, in one embodiment, an electrical signal produced by sensors 80, 82 is sent directly to motor 106 to achieve the above-described steering functionality. The rotational movement of trolling motor assembly 16 as a result of the input torque provided by motor 106 is delivered back to pedal assembly 40, and more specifically pedal 62 by way of mechanical connection 66 also as described above.

In other embodiments, power steering module 32 may optionally include a control arrangement 130. In such an embodiment, control arrangement 130 may perform various operations upon the electrical signal received by way of electrical connection 68 and then provide an appropriate output to motor 106 to operate the same. Additionally, head unit 20 of trolling motor assembly 16 may include various automated GPS and non GPS based navigational functionality as described in the various references incorporated by reference herein. In such a system, it is conceivable that no electrical signal is sent from pedal assembly 40 across electrical connection to control arrangement 130. Rather, head unit 20 delivers appropriate input signals to control arrangement 130, which are thereafter converted into an output signal to control motor 106. Accordingly, it is envisioned that control arrangement 130 includes all of the associated software, hardware and firmware necessary to achieve the aforementioned functionality. It is also conceivable that head unit 20 may be directly connected to motor 106 to directly control motor 106.

Yet further, pedal assembly 40 could incorporate its own optional control arrangement 132. Such a control arrangement 132 may be in additional to or in the alternative to any control arrangement 130 incorporated into power steering module 32. In such a configuration, rather than send the electrical signal by way of electrical connection to power steering module 32 directly from sensors 80, 82, these sensors, 80, 82 may first provide an input signal to control arrangement 132, which thereafter produces an appropriate output that is provided either directly to motor 106 and/or a control arrangement 130 within power steering module 32 if so incorporated. Control arrangement 132 could also be configured to receive GPS and non-GPS based commands from head unit 20. It is envisioned that control arrangement 132 incorporates all of the associated software, hardware, and firmware necessary to achieve the aforementioned functionality.

It is also envisioned that rather than provide an electrical signal to power steering module 32 by way of the wired electrical connection from pedal assembly 40, pedal assembly could be wirelessly electrically connected to power steering module 32. Indeed, power steering module 32 may include a controller and a receiver arrangement as control arrangement 130 for receiving a wireless control signal from pedal assembly 40. Likewise, pedal assembly 40 may include its own internal controller and transmitter for transmitting control signals to power steering module 32. Further control signals could also be provided to power steering module 32 by way of a wireless remote control 134. Control signals sent from remote control 134 could for example be communicated to the control arrangement 130 of power steering module 32 if so incorporated. Remote control 134 could be a stand-alone remote control utilizing any known wireless communication protocol. Alternatively, remote control 134 could be embodied by software alone such as for example an application installed on a mobile device such as a mobile phone.

Due to the use of motor 106 to assist in the steering trolling motor assembly 16, several other advantages arise. For example, the power assist provided by way of motor 106 to rotate trolling motor assembly 16 as described above may be adjustable. In other words, it may take greater user pedal actuation force to achieve the same amount of rotation of trolling motor assembly 16 by varying the input torque provided by motor 106. This may be advantageous where it is desirable to have a greater amount of tactile feedback at the pedal when manipulating trolling motor assembly 16 therewith.

It is also envisioned that pedal assembly 40 may utilize proportional steering speed. In other words, the harder a user pushes against pedal 62 of pedal assembly 40 the faster trolling motor assembly 16 will rotate about first axis 44 and first and second rotational directions 46, 48. This may be achieved by embodying sensors 80, 82 as pressure sensors which detect the pressure applied at pedal 62. However, sensors 80, 82 may be embodied by any other sensor operable to achieve the functionality described herein. For example, switches and/or potentiometers could be utilized instead of pressure sensors in combination with appropriate control algorithms to also achieve the proportional steering as discussed above. It will also be recognized by those of skill in the art that a single sensor, as opposed to dual sensors 80, 82 could also be utilized. For example, a rotation sensor coupled about the axis of rotation of pedal 62 could be utilized to detect the rotation thereof.

Another advantage of the use of power steering as described herein is the elimination of the aforementioned torque steer difficulties with conventional cable steer systems. That is, appropriate control algorithms can be implemented such that a sufficient torque is provided by motor 106 to achieve a consistent desired steering position despite the fact that there may be a greater resistive torque acting upon trolling motor assembly 16 due to water current.

Yet further, as another advantage, a heading lock functionality may be implemented at power steering unit 32. That is, a user may provide an appropriate input to control arrangement 120 so as to constantly maintain trolling motor assembly at a particular angular orientation to maintain a particular heading. It will be recognized that this functionality does not require the use of a GPS protocol. Such functionality has heretofore been unavailable in conventional cable steer systems.

As yet, another advantage, the combined cable and electric steer provisions provided by pedal assembly 40 and power steering module 32 may be supplied as a stand-alone system power steering system. That is, a user can convert a conventional cable steer system or manual steer system simply by connecting power steering module 32 to an existing trolling motor mount in a similar fashion as that described herein. Indeed, most shafts of trolling motor assemblies are standardized such that power steering module 32 may readily accept standard shafts of trolling motor assemblies. Once so incorporated, the aforementioned advantages of providing a combined cable and electric steer system would be possible. As such, embodiments of the instant invention herein contemplate utilizing a power assist module, pedal assembly, their associated interconnection provided by cable assembly 32 as an after-market stand-alone unit.

In yet another alternative to convert an existing cable steer system, it is contemplated by the invention that the pedal assembly may incorporate its own stand-alone power steering module such that the pedal assembly itself may be considered a power steering system. In such an embodiment, the pedal assembly is configured to accept the ends of the existing mechanical cables of a cable steer system, with the other ends of the cables remaining attached to the trolling motor assembly. Within the pedal assembly, sensors and a motor (See FIG. 3) are provided. The sensors detect motion of the pedal relative to the base. Upon detection, the motor, being coupled to the pedal to provide an input torque thereto, assists this motion of the pedal by supplementing the input torque provided by the user at the pedal. For example, the motor may be arranged such that it applies an input torque directly to third axis 60 (See FIG. 3) about which pedal 62 rotates, such that the total input torque provided is a combination of user input and input by the motor.

Such a configuration is operable to assist rotation of the pedal in either direction. It will be recognized that in such a configuration, the pedal assembly is independent of the structural particulars of the trolling motor, and simply needs to be attached to existing cables of the steering mechanism of the trolling to provide for the advantages of power steering discussed herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A trolling motor system, comprising:
   a mount for mounting the trolling motor system to a watercraft;
   a power steering module connected to the mount;
   a trolling motor assembly received by the power steering module; and
   a pedal assembly mechanically and electrically coupled to the power steering module providing mechanical and electrical steering to the power steering module.

2. The trolling motor system of claim 1, wherein the pedal assembly is mechanically coupled to the power steering module by at least one cable operably connected between the pedal assembly and the power steering module.

3. The trolling motor system of claim 2, wherein the at least one cable includes a first cable and a second cable, wherein each of the first and second cables are connected at a first end to a pedal of the pedal assembly, and wherein each of the first and second cables are connected at a second end to a cable drum of the power steering module.

4. The trolling motor system of claim 3, wherein rotation of a pedal of the pedal assembly about an axis of rotation in a first rotational direction causes the first cable to be taken up by the cable drum and the second cable to be paid out from the cable drum, and wherein rotation of the pedal assembly about the axis of rotation in a second rotational direction opposite the first rotational direction causes the first cable to be paid out from the cable drum and the second cable to be taken up by the cable drum.

5. The trolling motor system of claim 4, wherein the cable drum is mechanically coupled to the trolling motor assembly such that rotation of the cable drum causes a corresponding rotation of the trolling motor assembly about a longitudinal axis of the trolling motor.

6. The trolling motor system of claim 2, wherein the pedal assembly is electrically coupled to the power steering module by an electrical connection which is one of wired or wireless.

7. The trolling motor system of claim 6, wherein the pedal assembly includes a pedal rotationally mounted to a pedal base, and wherein the pedal assembly further comprises at least one sensor, the sensor arranged and configured to detect a control input by a user at the pedal, and wherein such a control input is electrically communicated via the electrical connection to the power steering module.

8. The trolling motor system of claim 7, wherein the power steering module further comprises a motor connected to the electrical connection, the motor configured such that the motor imparts a torque to the trolling motor assembly to cause the trolling motor assembly to rotate about a longitudinal axis of the trolling motor in response to the control input detected by the at least one sensor.

9. A trolling motor system, comprising:
a mount for mounting the trolling motor system to a watercraft, the mount including a base assembly and a main arm assembly movable relative to the base assembly;
a power steering module connected to an end of the main arm assembly and movable relative to the base with the main arm assembly;
a trolling motor assembly received by the power steering module, the trolling motor assembly linearly slidable relative to the power steering module about a first axis, and rotatable in first and second rotational directions about the first axis relative to the power steering module by way of an input torque provided by the power steering module; and
a pedal assembly providing an input signal to the power steering module to steer the trolling motor assembly.

10. The trolling motor system of claim 9, wherein the pedal assembly is mechanically and electrically coupled to the power steering module to provide the input signal to the power steering module.

11. The trolling motor system of claim 10, wherein the power steering module is configured such that the input signal is converted to an input torque applied to the trolling motor assembly.

12. A trolling motor system, comprising:
a mount for mounting the trolling motor system to a watercraft, the mount including a base assembly and a main arm assembly movable relative to the base assembly;
a power steering module connected to an end of the main arm assembly and movable relative to the base with the main arm assembly;
a trolling motor assembly received by the power steering module, the trolling motor assembly linearly slidable relative to the power steering module about a first axis, and rotatable in first and second rotational directions about the first axis relative to the power steering module by way of an input torque provided by the power steering module;
a pedal assembly providing an input signal to the power steering module to steer the trolling motor assembly;
wherein the pedal assembly is mechanically and electrically coupled to the power steering module to provide the input signal to the power steering module;
wherein the power steering module is configured such that the input signal is converted to an input torque applied to the trolling motor assembly; and
wherein the power steering module comprises a cable drum, a motor, and a drive train, wherein the cable drum and motor are mechanically coupled to the drive train, and wherein the drive train imparts the input torque to the trolling motor assembly.

13. The trolling motor system of claim 12, wherein at least one cable is connected between the cable drum and the pedal assembly such that a rotation of a pedal of the pedal assembly relative to a base of the pedal assembly causes a rotation of the cable drum.

14. The trolling motor system of claim 13, wherein the cable drum is mechanically coupled to the drive train such that rotation of the cable drum causes a rotation of a steer tube of the drive train.

15. The trolling motor system of claim 14, wherein an electrical connection is formed between the motor and the pedal assembly such that rotation of the pedal relative to the base causes a rotation of a drive shaft of the motor.

16. The trolling motor system of claim 15, wherein the drive shaft is mechanically coupled to the drive train such that rotation of the drive shaft causes a rotation of the steer tube of the drive train.

17. The trolling motor system of claim 16, wherein the steer tube slidably receives the trolling motor assembly.

18. A power steering system for a trolling motor system, comprising:
a power steering module configured for connection to a portion of the trolling motor system;
a pedal assembly operably connected to the power steering module providing control inputs to the power steering module to steer the trolling motor system, wherein the control inputs provide mechanical and electrical steering of the trolling motor system.

19. The power steering system of claim 18, wherein the power steering module is configured to receive a trolling motor assembly of the trolling motor system, and wherein the power steering module is configured to change an angular orientation of the trolling motor assembly in response to the control inputs.

20. A power steering system for a trolling motor system, the trolling motor system having at least one cable for providing steering inputs thereto, the power steering system comprising:
a pedal assembly, the pedal assembly configured to mechanically connect to the at least one cable of the trolling motor system, wherein the pedal assembly includes a pedal rotatable about a pedal axis relative to a base of the pedal assembly to actuate the at least one cable to steer the trolling, motor system; and
an electric motor, wherein the electric motor is mounted within the pedal assembly and operably connected to the pedal assembly to apply an input torque about the pedal axis upon a rotation of the pedal.

* * * * *